(12) United States Patent
Hakkarainen et al.

(10) Patent No.: US 7,477,743 B2
(45) Date of Patent: Jan. 13, 2009

(54) HYBRID NETWORK ENCRYPT/DECRYPT SCHEME

(75) Inventors: Tomi Hakkarainen, Nokia (FI); Rod Walsh, Tampere (FI)

(73) Assignee: Nokia Corporation, Espoo (FI)

( * ) Notice: Subject to any disclaimer, the term of this patent is extended or adjusted under 35 U.S.C. 154(b) by 843 days.

(21) Appl. No.: 10/072,147

(22) Filed: Feb. 7, 2002

(65) Prior Publication Data

US 2003/0147532 A1 Aug. 7, 2003

(51) Int. Cl.
H04L 9/00 (2006.01)

(52) U.S. Cl. .................. 380/239; 380/262; 380/281; 725/31

(58) Field of Classification Search ........... 380/239, 380/260, 262, 278, 287; 725/31
See application file for complete search history.

(56) References Cited

U.S. PATENT DOCUMENTS

| | | | | |
|---|---|---|---|---|
| 4,484,027 A | * | 11/1984 | Lee et al. | 380/239 |
| 5,619,274 A | * | 4/1997 | Roop et al. | 348/461 |
| 5,790,842 A | | 8/1998 | Charles et al. | |
| 5,805,705 A | * | 9/1998 | Gray et al. | 713/160 |
| 5,812,664 A | | 9/1998 | Bernobich et al. | |
| 5,991,400 A | * | 11/1999 | Kamperman | 380/239 |
| 6,047,051 A | * | 4/2000 | Ginzboorg et al. | 379/130 |
| 6,510,515 B1 | * | 1/2003 | Raith | 713/163 |
| 6,516,412 B2 | * | 2/2003 | Wasilewski et al. | 713/168 |
| 6,629,243 B1 | * | 9/2003 | Kleinman et al. | 713/163 |
| 6,650,754 B2 | * | 11/2003 | Akiyama et al. | 380/278 |
| 6,714,650 B1 | * | 3/2004 | Maillard et al. | 380/231 |
| 6,738,905 B1 | * | 5/2004 | Kravitz et al. | 713/194 |
| 6,748,082 B1 | * | 6/2004 | Vieweg et al. | 380/278 |
| 6,766,451 B1 | * | 7/2004 | Van Rijnsoever | 713/160 |
| 6,804,357 B1 | * | 10/2004 | Ikonen et al. | 380/241 |
| 6,870,932 B2 | * | 3/2005 | Jiang | 380/273 |
| 6,925,562 B2 | * | 8/2005 | Gulcu et al. | 713/172 |
| 7,072,865 B2 | * | 7/2006 | Akiyama | 705/51 |

(Continued)

FOREIGN PATENT DOCUMENTS

EP 1 024 626 A1 8/2000

(Continued)

OTHER PUBLICATIONS

Harney et al., "RFC 2094—Group Key Management Protocol (GKMP) Architecture", Jul. 1997, Retrieved from the Internet☐☐on Mar. 16, 2007: URL: <http://www.faqs.org/rfcs/rfc2094.html>.*

(Continued)

Primary Examiner—Gilberto Barron Jr.
Assistant Examiner—Minh Dinh
(74) Attorney, Agent, or Firm—Morgan & Finnegan, L.L.P.

(57) ABSTRACT

A hybrid method for a service provider to transmit decryption information (e.g., algorithms, parameters, keys) to clients in a secure manner and at low cost for use in decrypting broadcast services. The service provider uses a bi-directional channel (e.g., a GPRS channel) to receive service requests, authenticate clients and transmit currently valid decryption information (and, optionally, future decryption information) necessary to decrypt a broadcast service. The service provider transmits the encrypted service on a unidirectional channel (e.g., a DVB-T channel). The service provider preferably also changes the encryption of the service with time, and, as it does, transmits updated decryption information to its clients on the unidirectional channel. The updated decryption information is encrypted using the currently valid decryption information and may also include future decryption information and synchronization information.

74 Claims, 7 Drawing Sheets

U.S. PATENT DOCUMENTS

| | | | |
|---|---|---|---|
| 2001/0053226 A1 | 12/2001 | Akins, III et al. | |
| 2001/0055394 A1 | 12/2001 | Vanttinen et al. | |
| 2002/0001386 A1* | 1/2002 | Akiyama | 380/201 |
| 2003/0023564 A1 | 1/2003 | Padhye et al. | |
| 2003/0063740 A1* | 4/2003 | Sagar | 380/28 |
| 2005/0149974 A1* | 7/2005 | Norman | 725/73 |

FOREIGN PATENT DOCUMENTS

| | | |
|---|---|---|
| WO | WO0203694 | 1/2002 |
| WO | WO02080449 | 10/2002 |

OTHER PUBLICATIONS

PCT International Search Report, International Application No. PCT/IB03/00397, Date of Completion of Search—May 7, 2003, Sheets 1, Continuation of First Sheet (2) and 2.

European Search Report of EP Application No. 03700976.8—Date of Completion of the Search: Jun. 18, 2007.

* cited by examiner

HYBRID NETWORK ENCRYPT/DECRYPT SCHEME

FIELD OF THE INVENTION

This invention relates generally to encryption/decryption schemes, and more particularly, to a hybrid network encryption/decryption scheme for a service provider to transmit decryption information to clients in a secure manner and at low cost for use in decrypting broadcast services.

BACKGROUND OF THE INVENTION

Systems and methods for securely controlling access to information distributed to information receivers in a point-to-point or point-to-multi-point network are known as conditional access systems. The distributed information may include video, audio, text, data and/or any other type of information that may be subjected to conditional access, and is typically encrypted for transmission in accordance with an encryption algorithm. An encryption algorithm is a method by which a given signal is processed with a key to transform the signal into an encrypted signal. Parameters of an encryption algorithm may determine information such as the order of selection for processing of bits in the signal, the key and intermediate signals produced by such processing, and the sequence of such processing. The encrypted information is decrypted by an information receiver in accordance with a corresponding encryption algorithm, key and parameters.

SUMMARY OF THE INVENTION

A hybrid network encryption/decryption scheme is disclosed to enable a service provider to transmit decryption information to clients in a secure manner and at low cost for use in decrypting broadcast services.

An exemplary method for a service provider to transmit decryption information in a secure manner includes: receiving a request for a service from a requestor over a bi-directional channel; authenticating the requestor; transmitting first decryption information to the requestor over the bi-directional channel for use in decrypting the service; transmitting the service, encrypted with encryption information corresponding to the first decryption information, over a unidirectional channel; generating second decryption information for use in decrypting the service at a later time; transmitting the second decryption information over the unidirectional channel; and transmitting the service, encrypted with encryption information corresponding to the second decryption information, over the unidirectional channel.

In an embodiment directed to a method for a client to receive decryption information from a service provider in a secure manner, an exemplary method includes: requesting a service over a bi-directional channel; transmitting authentication information over the bi-directional channel; receiving first decryption information over the bi-directional channel; receiving the service over a unidirectional channel; decrypting the service using the first decryption information; receiving second decryption information over the unidirectional channel; and decrypting the service using the second decryption information.

Other and further aspects of the present invention will become apparent during the course of the following description and by reference to the attached drawings.

DETAILED DESCRIPTION

Figure 1:
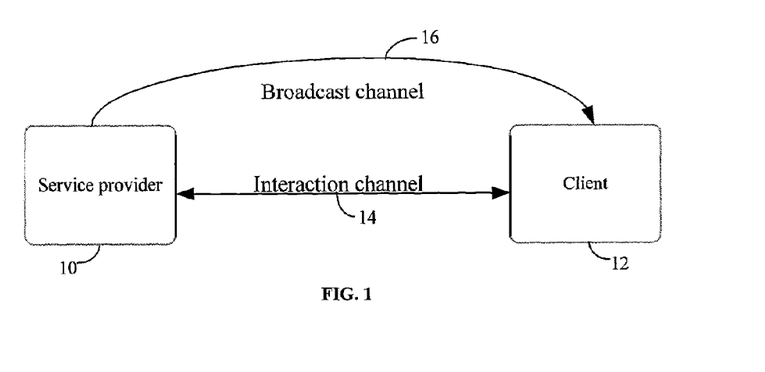
FIG. 1 is a block diagram illustrating an exemplary system of the present invention.

Referring now to the drawings, wherein like reference numerals refer to like parts, FIG. 1 is a block diagram illustrating an exemplary system of the present invention. As shown in FIG. 1 a service provider 10 makes available one or more services to a client 12 via a unidirectional channel 16, such as a digital video broadcasting (DVB) channel. The available services may include video, audio, text and/or data in any form such as a basic or premium movie channel, a pay-per-view movie, a streaming audio file, an electronic newspaper, application software, data files, etc. Moreover, the service may be made available to the client for the entire duration of the service (e.g., one pay-per-view movie) or some time interval thereof (e.g., one month of a premium movie channel).

Service provider 10 encrypts the services being broadcast on unidirectional channel 16 using encryption information. This encryption information may include algorithms such as DES, 3DES, Blowfish, Diffie-Hellman, RSA or the like, together with appropriate algorithm parameters and keys. In accordance with the present invention, the service provider 10 transmits decryption information (e.g., algorithms, parameters, keys) corresponding to the encryption information to clients in a secure manner and at low cost for use in decrypting the broadcast services. In an advantageous embodiment, the service provider 10 employs both a bi-directional channel 14 and the uni-directional channel 16 to transmit the decryption information to clients 12, as will be discussed in detail hereinafter.

The service provider 10 uses the bi-directional channel 14 to receive service requests and authenticate clients 12. The bi-directional channel may be either a wireless data link (e.g., GSM, GPRS, UMTS, Bluetooth, WLAN) or a wired data link (e.g., public switched telephone or cable) for establishing an on-line connection to the service provider 10. Authentication may be performed in any number of ways including a SIM card, a username/password or IP authentication methods such as Radius, Kerberos, IPsec, Point-to-Point Tunneling (PPTP) or other protocols based on a public key exchange.

Service provider 10 also uses the bi-directional channel to transmit initial decryption information (referred to herein as a "seed") needed to begin decrypting a service. Optionally, service provider 10 may also transmit decryption information that will be needed to decrypt the service at some point after the initial decryption; as will be discussed in detail, the service provider 10 preferably changes the encryption information, and thus, the corresponding decryption information at one or more points throughout the service. The decryption information may include the algorithm/parameters/keys needed to decrypt the service and, preferably, is accompanied by synchronization information to enable the client to determine when the decryption information may be used or, in other words, is valid. The decryption and synchronization information may be securely transmitted over the bi-directional network 16 at the IP level using IPsec, PPTP or the like. The various forms of synchronization information that may be employed will be discussed in detail hereinafter in connection with FIG. 6. As an alternative to the foregoing, the client may simply visit a shop and have decryption information (and any necessary synchronization information) installed on the client device or, alternatively, the client may receive a new SIM card in the postal mail with the necessary decryption/synchronization information securely stored in it.

In one embodiment, the time period spanning the duration of the service is referred to herein as a "macro period". At various points in time throughout the macro period, the service provider 10 may change the encryption of the service and thereby change the corresponding decryption information. These points in time are referred to herein as "micro periods". The changes may be to the keys alone, the keys and the parameters or the keys, the parameters and the algorithm, with the last option providing the most protection against unauthorized decryption of the service. In an alternate embodiment, no change is made to the decryption information. Instead, the micro periods are used only to repeat the earlier-supplied decryption information.

In advance of a micro period, service provider 10 transmits updated decryption information (preferably with synchronization information) to the client 12 on the unidirectional channel to enable client 12 to continue decrypting the service after the micro period has begun. The updated decryption information may also include decryption information that will be needed to decrypt the service at some point after the next micro period (i.e., future decryption information). The updated decryption and synchronization information is encrypted using the currently valid decryption information. The client 12 may then decrypt the new decryption information using the currently valid decryption information and, at the synchronized time, begin using the updated decryption information to decrypt the service. The process of providing updated decryption information over the unidirectional network 16 is repeated at each micro period to the extent necessary until the service has ended. In an alternate embodiment, however, if the service does not end with the last micro period of the current macro period, the service provider 10 may require the client 12 to re-connect to it via the bi-directional channel 16 to obtain a new seed and synchronization information to enable it to continue decrypting the service.

Figure 2:
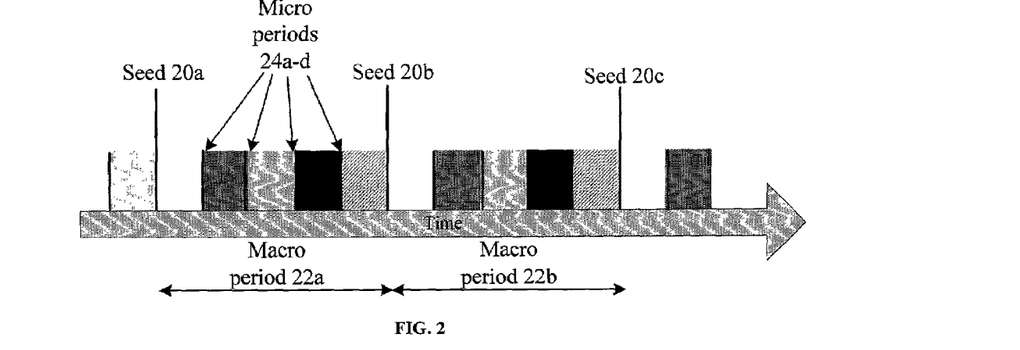
FIG. 2 is a time domain diagram illustrating the relationship between macro periods and micro periods.

FIG. 2 is a time domain diagram illustrating an exemplary relationship between macro periods and micro periods. As shown in FIG. 2, a seed 20*a* is provided via the bi-directional channel 14 at the beginning of a macro period 22*a*. Future decryption information, such as that for the first micro period 24*a*, may accompany the seed. Thereafter, decryption information is provided via the unidirectional channel 16 in advance of each micro period 24*a-d*, preferably only for those micro periods for which future decryption information was not previously provided. Updated decryption information transmitted over the unidirectional channel 16 is encrypted using the currently valid decryption information. For example, the decryption information for the first micro period 24*a* is encrypted using the seed 20*a*. Thereafter, the decryption information for the second micro period 24*b* is encrypted using the decryption information associated with the first micro period 24*a*. This process is repeated until the last micro period 24*d*. As previously indicated, if the service has not ended after the last micro period 24*d*, the client 12 may be required to reconnect to service provider 10 via the bi-directional channel 14 and obtain a new seed 20*b* for the second macro period 22*b*.

Figure 3:
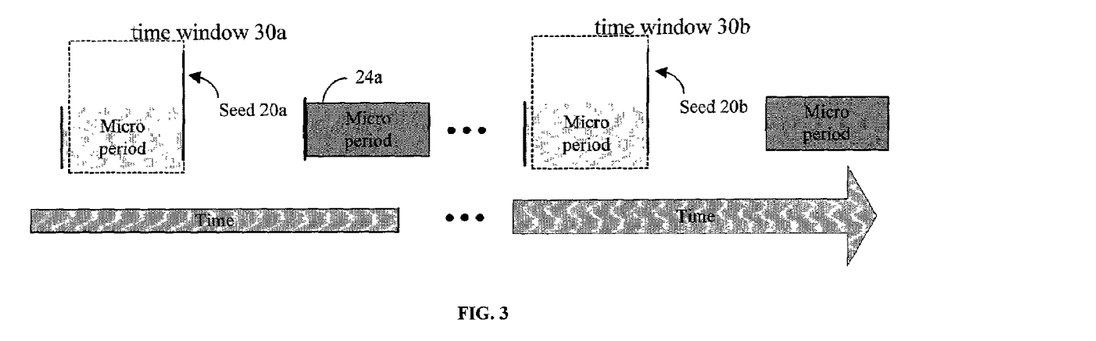
FIG. 3 is a time domain diagram illustrating time windows during which a service provider makes seeds available to clients.

FIG. 3 is a time domain diagram illustrating time windows during which a service provider makes seeds available to clients. As shown in FIG. 3, a time window 30*a* is established by service provider 10 during which clients 10 may connect to service provider 10 via the bi-directional channel 14 to request a service and obtain a seed in advance of service transmission. Thus, "pre-fetching" of decryption information is provided. In one embodiment, this may include future decryption information in addition to a seed. As shown in FIG. 3, time windows 30*a* and 30*b* are designated for obtaining seeds 20*a* and 20*b*, respectively. Moreover, different time windows may be randomly assigned to different clients 12 to minimize the load that would be caused by all clients 12 connecting to the service provider 10 over the bi-directional channel to obtain decryption information at the same time.

Figure 4:
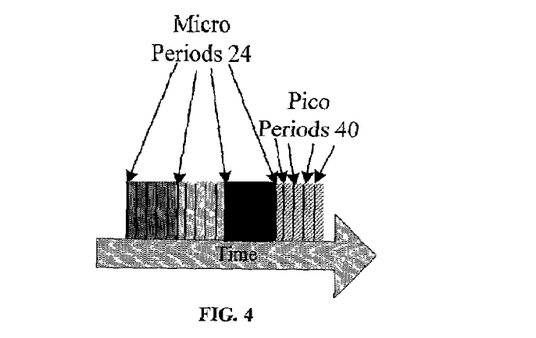
FIG. 4 is a time domain diagram illustrating the relationship between micro periods and pico periods.

FIG. 4 is a time domain diagram illustrating the relationship between micro periods and pico periods. As shown in FIG. 4, each micro period 24 may be divided into one or more "pico periods" 40 during which the decryption information that is valid for that micro period 24 is re-broadcast on the uni-directional channel 16. Thus, a client 12 who failed to receive the decryption information for the current micro period (for reasons such as switching the receiver off, wandering outside of the coverage area or encountering interference) can obtain it without having to re-connect to the service provider 10 via the bi-directional channel 14. In the absence of repeating the current decryption information during the current micro period 24, if the current decryption information was not previously transmitted to the client 12 as future decryption information, a connection to the service provider 10 via the bi-directional channel 14 must be established.

Figure 5:
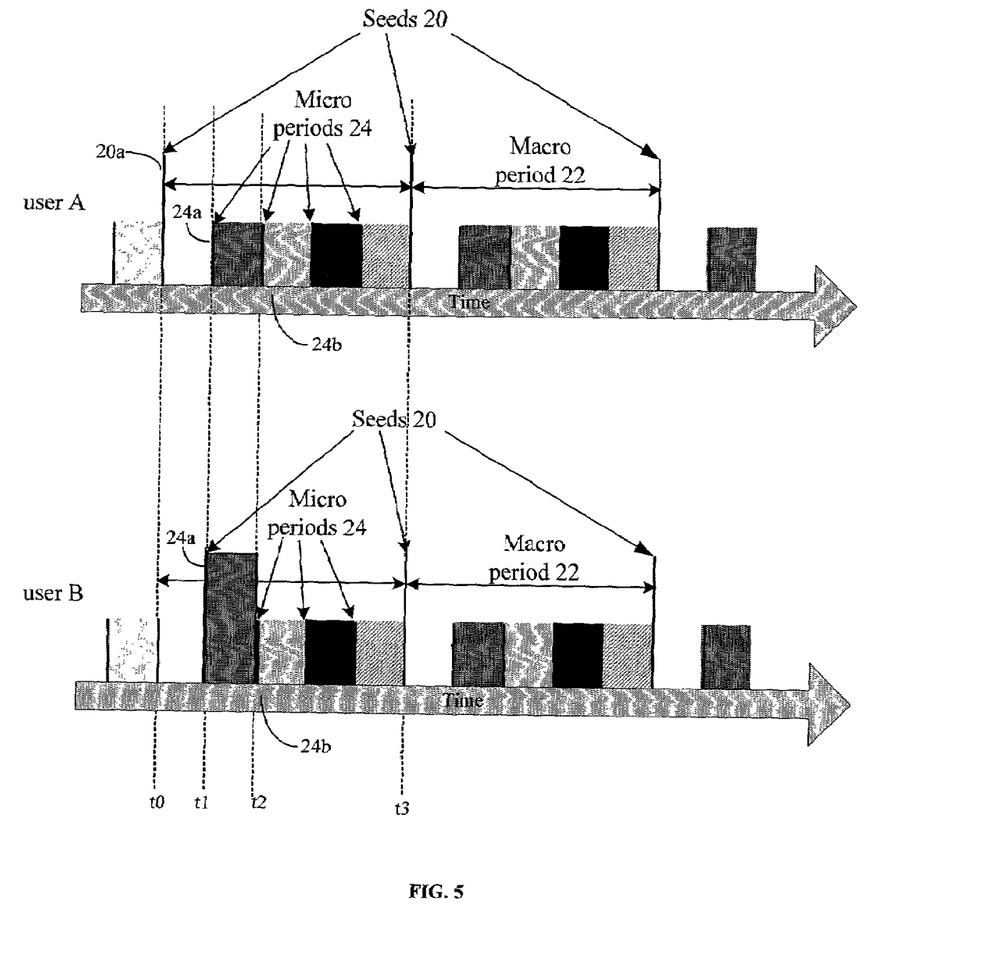
FIG. 5 is a time domain diagram illustrating the assignment of a seed to a user who has requested a service after the service has commenced.

FIG. 5 is a time domain diagram illustrating the assignment of a seed to a user (in FIG. 5, User "B") who has requested a service after service transmission has commenced but before the start of the first micro period. As shown in FIG. 5, at some point in advance of the service transmission start time "t0", user A connects to service provider 10 via the bi-directional channel 14 and receives a seed 20*a* for decrypting a service. At the service transmission start time "t0", user A begins using the seed 20*a* to decrypt the service. At some point in advance of the first micro period 24*a* start time "t1", user A will receive updated decryption information over the uni-directional channel for use in decrypting the service during the first micro period 24*a*. The updated decryption information will be encrypted using the seed 20*a*.

Also at some point in advance of the first micro period 24*a* start time "t1", user B connects to service provider 10 via the bi-directional channel 14 and receives decryption information for use in decrypting the service during the first micro period 24*a*. Note that this is micro-period decryption information for User A, but a seed for User B. Thereafter, at some point in advance of the next micro-period 24*b*, both Users A and B will receive updated decryption information over the uni-directional channel for use in decrypting the service during the second micro period 24*b*. The updated decryption information will be encrypted using the decryption information for micro period $24a$. This process is repeated between times "t2" and "t3" until the end of the last micro period, at which time, if the service has not ended, both users A and B preferably will need to reconnect to service provider 10 via the bi-directional channel 14 to obtain the seed for the next macro period 22.

Figure 6:
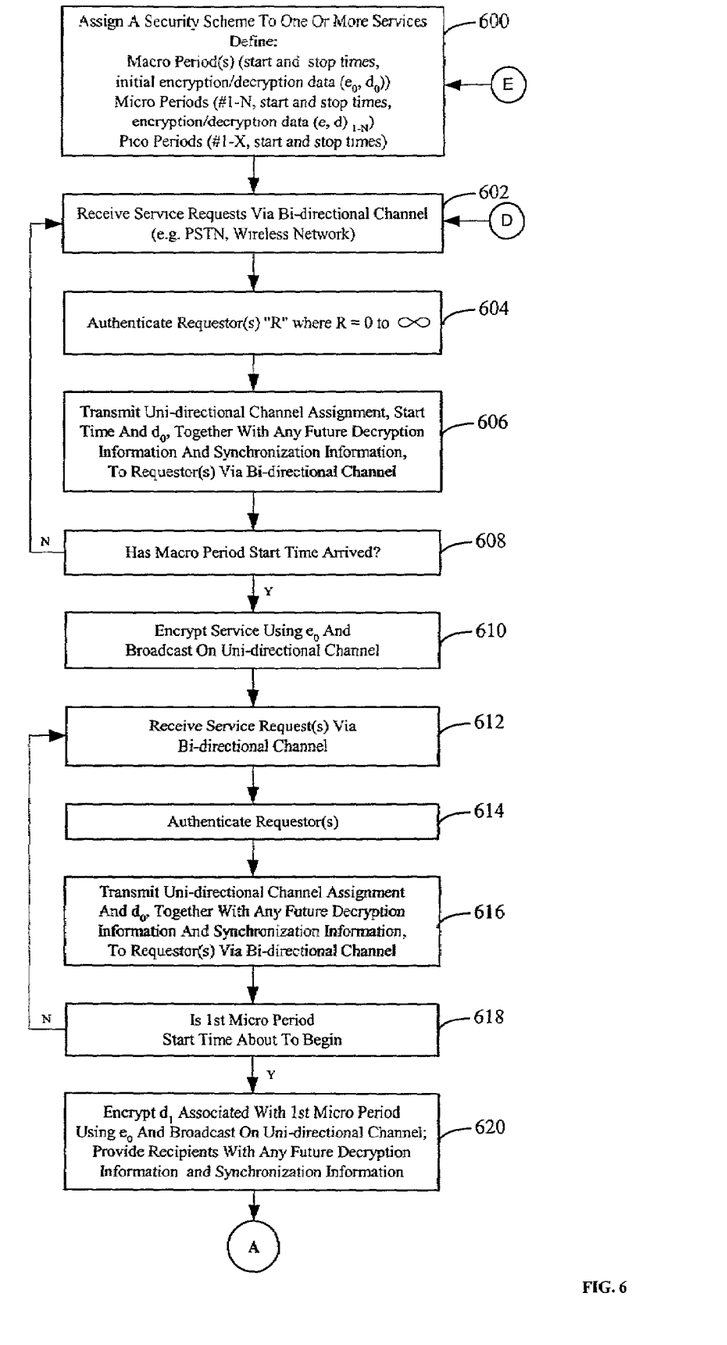
FIG. 6 is a flow diagram illustrating an exemplary process performed by a service provider in accordance with one embodiment of the present invention.

FIG. 6 is a flow diagram illustrating an exemplary process performed by a service provider in accordance with one embodiment of the present invention. In step 600, service provider 10 assigns a security scheme to one or more services. In an exemplary embodiment, this involves defining one or more macro periods for the duration of the service (e.g., start and stop times together with initial encryption/decryption information ($e_0$, $d_0$)), one or more micro periods for each macro period (e.g., start and stop times together with encryption/decryption information $(e, d)_{1-N}$) and one or more pico periods for each micro period (e.g., start and stop times). It will be appreciated that as an additional security measure against unauthorized decryption of the service, not all of the details of the security scheme need be determined in advance of service transmission.

In step 602, at some time in advance of service transmission, such as the time window discussed above in connection with FIG. 3, service provider 10 receives requests for a service from clients 12 via the bi-directional channel 14. In step 604, service provider 10 authenticates the requesters. As discussed above in connection with FIG. 1, authentication may be performed in any number of ways including a SIM card, a username/password or IP authentication methods such as Radius, Kerberos, IPsec, Point-to-Point Tunneling (PPTP) or any other protocols based on a public or private key exchange. In step 606, service provider 10 transmits information needed to receive the service to the requestors via the bi-directional channel 14. Such information may include the unidirectional channel assignment for the service, the start time, the seed for decrypting the service do together with any future decryption seeds and any synchronization information.

The synchronization information provided to the client 12 may take various forms. For example, synchronization information may include an announcement that after a certain packet number, decryption should be performed using particular decryption information. Alternatively, synchronization information may include a "heartbeat" signal transmitted continuously on the unidirectional channel 16. In this embodiment, the service provider 10 changes the frequency of this signal to indicate that the decryption information has changed. In an alternate embodiment, service provider 10 transmits an announcement about the decryption information currently in use (e.g., it is now time to use algorithm 5 with keys 1, 2 and 8, and parameters 5 and 7). The decryption information itself, however, is transmitted in encrypted form. In yet an alternate embodiment, the service provider 10 does not provide any synchronization information to the client 12. Instead, the client 12 receives two consecutively valid sets of decryption information and simply tries to decrypt the service being transmitted using both sets of information and uses the set that works.

In step 608, the service provider 10 determines whether the macro period start time has arrived. If the macro period start time has not arrived, then the service provider 10 continues attending to service requests by repeating steps 602-606. However, if the macro period start time has arrived, then in step 610, service provider 10 encrypts the service using $e_0$ and begins broadcasting the service on the uni-directional channel 16.

In steps 612-616, service provider 10 continues attending to requests for the service being broadcast, which includes receiving requests from clients 12 via the bi-directional channel, authenticating requestors and transmitting information needed to receive the service to the requestors. In step 618, service provider 10 determines whether the first micro period is about to begin. If the first micro period is not about to begin, then steps 612-616 are repeated and service provider 10 continues attending to service requests. However, if the first micro period is about to begin, then, in step 620, service provider 10 encrypts the decryption information associated with the first micro period (i.e., $d_1$) using $e_0$ and broadcasts the service on the unidirectional channel. The service provider also provides the recipients with any necessary synchronization information and future decryption information, both of which are encrypted using $e_0$. In step 622, service provider 10 switches the encryption of the service being broadcast from $e_0$ to $e_1$. Thereafter, in steps 624-628, service provider 10 continues attending to service requests via the bi-directional channel 14, which includes transmitting the currently valid decryption information (i.e., now $d_1$) to the requestors via channel 14.

In step 630, service provider 10 determines whether the first pico period 40 has arrived. If it has not yet arrived, service provider 10 repeats steps 624-628. However, if the first pico period start time has arrived, then, in step 632, service provider 10 rebroadcasts $d_i$ encrypted with $e_0$ on the unidirectional channel together with any future decryption information and synchronization information. Then, in steps 634-638, service provider 10 continues attending to service requests via the bi-directional channel 14.

In step 640, service provider 10 determines whether there are any other pico periods associated with the first micro period. If there are other pico periods associated with the first micro period then, in step 642, service provider 10 determines whether the next pico period start time has arrived. If the next pico period start time has not yet arrived, service provider 10 simply continues attending to service requests via the bi-directional channel 14. (Steps 634-642.) However, if the next pico period start time has arrived then, in step 632, service provider 10 rebroadcasts $d_i$ encrypted with $e_0$ on the unidirectional channel together with any future decryption information and synchronization information. Thereafter, service provider 10 repeats steps 632-642 until there are no other pico periods associated with the first micro period. At that point, in step 644, service provider 10 determines whether there are any other micro periods associated with the current macro period.

If it is determined in step 644 that there are other micro periods associated with the current macro period, then, in step 646, service provider 10 determines whether the next micro period is about to begin. If the next micro period is not about to begin, then the service provider 10 continues attending to service requests via the bi-directional channel 14. (Steps 648-652.) If it is determined in step 646 that the next micro period is about to begin, then, in step 654, the service provider 10 broadcasts decryption data "d" associated with the next micro period (e.g., $d_2$) on the unidirectional channel 16 together with future decryption information and synchronization information. These pieces of information are encrypted with encryption data "e" associated with the current micro period (e.g., $e_1$). In step 656, once the next micro period has started (i.e., has become the current micro period), the service provider 10 switches the encryption of the service to encryption using encryption information "e" associated with the next micro period (e.g., $e_2$).

Thereafter, in steps 658-662, the service provider 10 continues attending to service requests over the bi-directional channel, until, in step 664, it is determined that the first pico period of the current micro period has arrived. Once the first pico period has arrived, in step 666, service provider 10 rebroadcasts decryption data associated with the current micro period together with future decryption information and synchronization information to client 12 on the uni-directional channel. This information is encrypted with encryption information associated with the previous micro period. In steps 668-672, the service provider 10 continues attending to service requests over the bi-directional channel.

In step 674, service provider 10 determines whether there are any other pico periods associated with the current micro period. If there are other pico periods associated with the current micro period then, in step 676, service provider 10 determines whether the next pico period start time has arrived. If the next pico period start time has not yet arrived, service provider 10 continues attending to service requests. (Steps 668-676.) However, in step 676, once the next pico period start time has arrived, service provider 10 rebroadcasts decryption data associated with the current micro period together with any future decryption information and synchronization information on the unidirectional channel. This information is encrypted with encryption information "e" associated with the previous micro period. Service provider 10 then repeats steps 668-676 until there are no other pico periods associated with the current micro period.

Once it is determined that there are no other pico periods associated with the current micro period, in step 674, service provider 10 returns to step 644 and determines whether there are any other micro periods associated with the current macro period. If there are other micro periods associated with the current macro period, service provider 10 repeats steps 646-676 until there are no other such micro periods associated with the current macro period. If there are no other micro periods, then service provider 10 continues to broadcast the encrypted service on the unidirectional channel 16 until the end of the macro period.

At the end of the macro period, in step 680, the service provider 10 determines whether the service being broadcast on the unidirectional channel 16 has ended. If the service has not ended, service provider 10 repeats steps 602-676 for each subsequent macro period allocated to the service, and, in so doing, preferably requires client 12 to re-authenticate itself and obtain a new seed via the bi-directional channel for each macro period. Alternatively, the seed may be provided over the unidirectional channel and be encrypted using the encryption information from the last micro period of the previous macro period.

If it is determined in step 680 that the service has ended, then in step 682, service provider 10 confirms that the encryption scheme also has ended on the unidirectional channel. If the encryption scheme has ended, then service provider 10 returns to step 600 where it can reallocate the same encryption scheme, or a modified version thereof, to another service. However, if service provider 10 determines in step 682 that the encryption scheme has not ended then, in step 684, an encryption programming error must have occurred because both the service and the encryption scheme should have ended at the same time.

Figure 7:
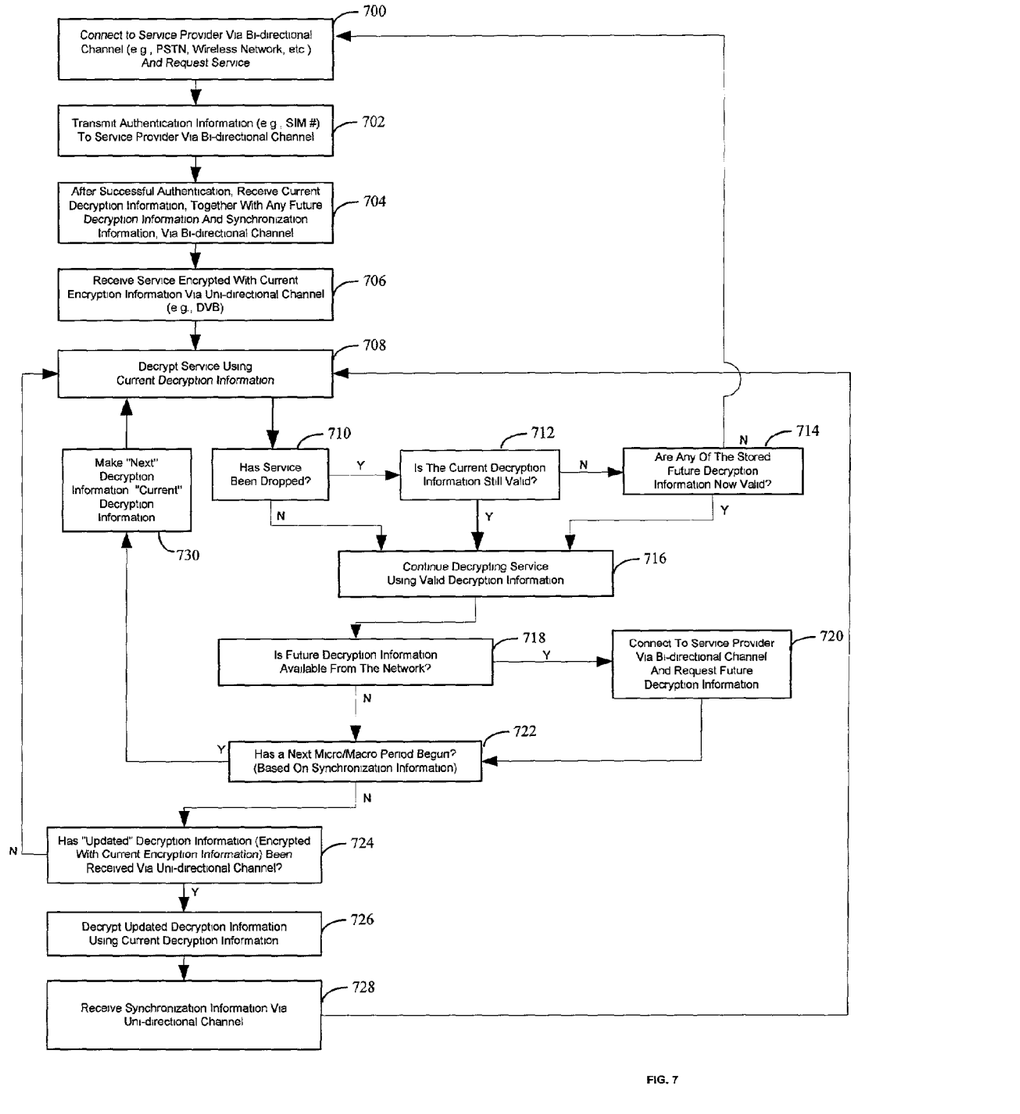
FIG. 7 is a flow diagram illustrating an exemplary process performed by a client in accordance with one embodiment of the present invention.

FIG. 7 is a flow diagram illustrating an exemplary process performed by a client in accordance with one embodiment of the present invention. In step 700, client 12 connects to the service provider 10 via a bi-directional channel 14 and requests a service. In step 702, client 12 transmits authentication information to the service provider 10 via the bi-directional channel. In step 704, after successful authentication, client 12 receives the current decryption information (e.g., a seed) together with any future decryption information and synchronization information via the bi-directional channel. In step 706, client 12 begins receiving the service encrypted with the current encryption information via the unidirectional channel 16. In step 708, client 12 decrypts the service using the current decryption information.

In step 710, client 12 determines whether the service has been dropped. If the service has been dropped, client 12, in step 712, determines whether the current decryption information that it was using in step 708 to decrypt the service is still valid. This may be accomplished using synchronization information provided by the service provider 10 or, alternatively, may be determined by the client 12 through trial and error. If the client 12 determines that the current decryption information is not valid then, in step 714, it determines whether any of the stored future decryption information (e.g., that received in step 704) is now valid. The validity of the future decryption information may be determined in the same manner as the validity of the current decryption information. If none of the future decryption information is now valid, client 12 must obtain currently valid decryption information over the bi-directional channel by repeating steps 700-708.

In steps 710-714, if the service was not dropped or, if it was dropped but either the current or the future decryption information was valid, then in step 716, the client 12 continues to decrypt the broadcast service using valid decryption information. Thereafter, in step 718, the client 12 determines whether future decryption information is available from the service provider 10. Client 12 may be told by the service provider 10 over the unidirectional channel of the availability of future decryption information. If future decryption information is available then, in step 718, client 12 connects to the service provider 10 via the bi-directional channel 16 and requests the future decryption information. This preferably would involve the client 12 re-authenticating itself to the service provider 10. Alternatively, the future decryption information may be provided via the unidirectional channel using current encryption information. In either case, client 12 would store the future decryption information. In an alternate embodiment, the client 12 may store only some of the future decryption information or, may choose not to obtain any future decryption information, for example, in cases where the client 12 lacks sufficient memory to store such information.

Whether or not future decryption information is available, in step 720, client 12 determines whether the next period (micro or macro) has begun. This determination is made using synchronization information provided by the service provider 10 or, alternatively, may be determined by the client 12 through trial and error. If the next micro or macro period has not yet begun then, in step 724, client 12 determines whether updated decryption information (encrypted with the current encryption information) has been received via the unidirectional channel. Updated decryption information may include decryption information needed for the immediately next period or future decryption information needed for later periods.

If updated decryption information has not been received, client 12 returns to step 708 and continues to decrypt the service using the current decryption information. However, if updated decryption information was received then, in step 726, client 12 decrypts the updated decryption information using the current decryption information. (The updated decryption information may also include rebroadcast decryption information needed for the current micro period, in which case, it would be decrypted using decryption information associated with the micro period preceding the current micro period.) In step 728, client 12 also receives synchronization information for the updated decryption information via the unidirectional channel. Thereafter, client 12 returns to step 708 and continues to decrypt the service using the current decryption information.

If, in step 722, it was determined that the next micro/macro period has begun then, in step 730, client 12 makes the decryption information associated with the next micro/macro period that has just begun the current decryption information. Thereafter, client 12 returns to step 708 and decrypts the service being broadcast on the unidirectional channel using the current decryption information. Client 12 repeats steps 700-730 as necessary until it can no longer decrypt the service being broadcast indicating that the service that the client 12 was authorized to receive has ended.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

We claim:

1. A method, comprising:
   receiving a request for a service from a requestor over a bi-directional channel;
   authenticating the requestor;
   transmitting first decryption information to the requestor over the bi-directional channel, wherein the first decryption information decrypts the service;
   transmitting the service, encrypted with encryption information corresponding to the first decryption information, over a unidirectional channel;
   generating second decryption information for use in decrypting the service;
   encrypting the second decryption information with the encryption information corresponding to the first decryption information;
   transmitting the second decryption information, encrypted with the encryption information corresponding to the first decryption information, over the unidirectional channel, wherein the second decryption information decrypts the service; and
   transmitting the service, encrypted with encryption information corresponding to the second decryption information rather than with encryption information corresponding to the first decryption information, over the unidirectional channel.

2. The method of claim 1 wherein the first decryption information corresponds to a seed of a macro period and the second decryption information corresponds to a micro period of the macro period.

3. The method of claim 2 wherein the micro period is a first micro period of the macro period.

4. The method of claim 1 wherein the second decryption information is transmitted as future decryption information.

5. The method of claim 1 wherein the first decryption information and the second decryption information correspond to different micro periods of a macro period.

6. The method of claim 1 further comprising:
   transmitting future decryption information over the bi-directional channel; and
   transmitting the service encrypted with encryption information corresponding to the future decryption information.

7. The method of claim 1 wherein the request for a service is a request for the service in its entirety or a time interval thereof.

8. The method of claim 1 wherein the bi-directional channel is one of a wireless network.

9. The method of claim 8 wherein the wireless network is a GSM network.

10. The method of claim 8 wherein the wireless network is a Bluetooth network.

11. The method of claim 1 wherein the unidirectional channel is one of a DVB-T network.

12. The method of claim 1 wherein the authenticating is performed using a SIM card number.

13. The method of claim 1 wherein the authenticating is performed using a user ID and password.

14. The method of claim 1 wherein the authenticating is performed using IP authentication.

15. The method of claim 14 wherein the IP authentication is a public key encryption scheme.

16. The method of claim 1 wherein the first decryption information is transmitted to the requestor over the bi-directional channel before the service has begun.

17. The method of claim 1 wherein generating second decryption information involves changing a decryption key, a decryption parameter and/or a decryption algorithm of the first decryption information.

18. The method of claim 1 further comprising:
   transmitting synchronization information for use by the requestor in determining when the second decryption information is valid.

19. The method of claim 1 further comprising:
   re-transmitting the second decryption information over the unidirectional channel.

20. A method, comprising:
   receiving a request for a service from a requestor over a bi-directional channel;
   authenticating the requestor;
   providing decryption information to the requestor over the bi-directional channel, wherein the decryption information decrypts the service;
   transmitting the service, encrypted with encryption information corresponding to the decryption information, over a unidirectional channel;
   changing the decryption information needed to decrypt the service throughout the transmission of the service;
   encrypting the changed decryption information with encryption information corresponding to decryption information that was previously provided to the reguestor;
   providing the requestor with the encrypted changed decryption information over the unidirectional channel; and
   transmitting the service, encrypted with encryption information corresponding to the changed decryption information rather than with encryption information corresponding to the decryption information sent over the hi-directional channel, over the unidirectional channel.

21. The method of claim 20 wherein the previously provided decryption information was provided over the bi-directional channel.

22. The method of claim 20 wherein the previously provided decryption information was provided over the unidirectional channel.

23. A method, comprising:
requesting a service over a hi-directional channel;
transmitting authentication information over the hi-directional channel;
receiving first decryption information over the hi-directional channel, wherein the first decryption information decrypts the service;
receiving the service over a unidirectional channel, wherein the service is encrypted with encryption information corresponding to the first decryption information;
decrypting the service using the first decryption information;
receiving second decryption information over the unidirectional channel, wherein the second decryption information is encrypted with the encryption information corresponding to the first decryption information;
decrypting the encrypted second decryption information using the first decryption information;
receiving the service over the unidirectional channel, wherein the service is encrypted with encryption information corresponding to the second decryption information; and
decrypting the service using the second decryption information rather than the first decryption information.

24. The method of claim 23, further comprising:
upon completion of the service, requesting another service via the bi-directional channel.

25. The method of claim 23, further comprising:
decrypting the service with the first decryption information until unsuccessful and thereafter decrypting the service with the second decryption information.

26. The method of claim 23 wherein the authentication includes a SIM card number.

27. The method of claim 25 wherein the authentication includes a user ID and password.

28. The method of claim 23 wherein the authentication includes IP authentication.

29. The method of claim 28 wherein the IP authentication is a public key encryption scheme.

30. The method of claim 23 wherein the service is requested during a predetermined window of time.

31. The method of claim 23, further comprising:
determining whether the service has been dropped;
if the service has been dropped,
attempting to re-receive the service;
upon re-receiving the service, determining whether either the first decryption information or the second decryption information is valid decryption information;
if one of the first decryption information or the second decryption information is valid decryption information, decrypting the service with the valid decryption information.

32. The method of claim 31, further comprising:
upon re-receiving the service, if nether the first decryption information nor the second decryption information is valid decryption information,
establishing a connection to the service provider via the bi-directional channel;
transmitting authentication information over the bi-directional channel;
receiving valid decryption information over the bi-directional channel; and
decrypting the service using the valid decryption information.

33. The method of claim 23, further comprising:
receiving synchronization information for determining when the second decryption information is valid.

34. The method of claim 25, further comprising:
receiving and storing one or more future keys for decrypting the service after the first and second decryption information are no longer valid.

35. A method, comprising:
receiving a request for a service from a requestor;
authenticating the requestor;
transmitting first decryption information over a bi-directional channel for reception by the requestor;
installing the first decryption information on a device of the requestor, wherein the first decryption information decrypts the service;
transmitting the service, encrypted with encryption information corresponding to the first decryption information, over a unidirectional channel;
generating second decryption information for use in decrypting the service at a later time;
encrypting the second decryption information with the encryption information corresponding to the first decryption information;
transmitting the encrypted second decryption information over the unidirectional channel for reception by the requestor; and
transmitting the service, encrypted with encryption information corresponding to the second decryption information rather than with encryption information corresponding to the first decryption information, over the unidirectional channel.

36. A method comprising:
receiving a request for a service from a requestor over a bi-directional channel;
authenticating the requestor;
transmitting a first key to the requestor over the bi-directional channel for decrypting the service;
transmitting the service, encrypted with the first key, over a unidirectional channel;
generating a second key for decrypting the service;
encrypting the second key with the first key;
transmitting the encrypted second key over the unidirectional channel; and
transmitting the service, encrypted with the second key rather than with the first key, over the unidirectional channel.

37. The method of claim 36 wherein, in addition to the first and second keys, at least one of an algorithm and a parameter are transmitted to the requestor to decrypt the service.

38. An apparatus, comprising:
a service provider configured to:
receive a request for a service from a requestor over a bi-directional channel;
authenticate the requestor;
transmit first decryption information to the requestor over the bi-directional channel, wherein the first decryption information decrypts the service;
transmit the service, encrypted with encryption information corresponding to the first decryption information, over a unidirectional channel;
generate second decryption information for use in decrypting the service;

encrypt the second decryption information with the encryption information corresponding to the first decryption information;

transmit the second decryption information, encrypted with the encryption information corresponding to the first decryption information, over the unidirectional channel, wherein the second decryption information decrypts the service; and transmit the service, encrypted with encryption information corresponding to the second decryption information rather than with encryption information corresponding to the first decryption information, over the unidirectional channel.

39. The apparatus of claim 38 wherein the first decryption information corresponds to a seed of a macro period and the second decryption information corresponds to a micro period of the macro period.

40. The apparatus of claim 39 wherein the micro period is a first micro period of the macro period.

41. The apparatus of claim 38 wherein the second decryption information is transmitted as future decryption information.

42. The apparatus of claim 38 wherein the first decryption information and the second decryption information correspond to different micro periods of a macro period.

43. The apparatus of claim 38 wherein the service provider is further configured to:
transmit future decryption information over the bi-directional channel; and
transmit the service encrypted with encryption information corresponding to the future decryption information.

44. The apparatus of claim 38 wherein the request for a service is a request for the service in its entirety or a time interval thereof.

45. The apparatus of claim 38 wherein the bidirectional channel is one of a wireless network.

46. The apparatus of claim 45 wherein the wireless network is a GSM network.

47. The apparatus of claim 45 wherein the wireless network is a Bluetooth network.

48. The apparatus of claim 38 wherein the unidirectional channel is one of a DViB-T network.

49. The apparatus of claim 38 wherein the authenticating is performed using a SIM card number.

50. The apparatus of claim 38 wherein the authenticating is performed using a user ID and password.

51. The apparatus of claim 38 wherein the authenticating is performed using IP authentication.

52. The apparatus of claim 51 wherein the IP authentication is a public key encryption scheme.

53. The apparatus of claim 38 wherein the first decryption information is transmitted to the requestor over the bidirectional channel before the service has begun.

54. The apparatus of claim 38 wherein generating second decryption information involves changing a decryption key, a decryption parameter and/or a decryption algorithm of the first decryption information.

55. The apparatus of claim 38 wherein the service provider is further configured to:
transmit synchronization information for use by the requestor in determining when the second decryption information is valid.

56. The apparatus of claim 38 wherein the service provider is further configured to:
re-transmit the second decryption information over the unidirectional channel.

57. An apparatus, comprising:
a service provider configured to:
receive a request for a service from a requestor over a bi-directional channel;
authenticate the requestor;
provide decryption information to the requestor over the bi-directional channel, wherein the decryption information decrypts the service;
transmit the service, encrypted with encryption information corresponding to the decryption information, over a unidirectional channel;
change the decryption information needed to decrypt the service throughout the transmission of the service;
encrypt the changed decryption information with encryption information corresponding to decryption information that was previously provided to the requestor;
provide the requestor with the encrypted changed decryption information over the unidirectional channel; and
transmit the service, encrypted with encryption information corresponding to the changed decryption information rather than with encryption information corresponding to the decryption information sent over the bi-directional channel, over the unidirectional channel.

58. The apparatus of claim 57 wherein the previously provided decryption information is provided over the bidirectional channel.

59. The apparatus of claim 57 wherein the previously provided decryption information is provided over the unidirectional channel.

60. An apparatus, comprising:
a client configured to:
request a service over a bi-directional channel;
transmit authentication information over the bi-directional channel;
receive first decryption information over the bi-directional channel, wherein the first decryption information decrypts the service;
receive the service over a unidirectional channel, wherein the service is encrypted with encryption information corresponding to the first decryption information;
decrypt the service using the first decryption information;
receive second decryption information over the unidirectional channel, wherein the second decryption information is encrypted with the encryption information corresponding to the first decryption information;
decrypt the encrypted second decryption information using the first decryption information;
receive the service over the unidirectional channel, wherein the service is encrypted with encryption information corresponding to the second decryption information; and
decrypt the service using the second decryption information rather than the first decryption information.

61. The apparatus of claim 60, wherein the client is further configured to:
upon completion of the service, request another service via the bi-directional channel.

62. The apparatus of claim 60, wherein the client is further configured to:
decrypt the service with the first decryption information until unsuccessful and thereafter decrypt the service with the second decryption information.

63. The apparatus of claim 60 wherein the authentication includes a SIM card number.

64. The apparatus of claim 60 wherein the authentication includes a user ID and password.

65. The apparatus of claim 60 wherein the authentication includes IP authentication.

66. The apparatus of claim 65 wherein the IP authentication is a public key encryption scheme.

67. The apparatus of claim 60 wherein the service is requested during a predetermined window of time.

68. The apparatus of claim 60, wherein the client is further configured to:

determine whether the service has been dropped;

if the service has been dropped, attempt to re-receive the service;

upon re-receiving the service, determine whether either the first decryption information or the second decryption information is valid decryption information;

if one of the first decryption information or the second decryption information is valid decryption information, decrypt the service with the valid decryption information.

69. The apparatus of claim 68, wherein the client is further configured to:

upon re-receiving the service, if nether the first decryption information nor the second decryption information is valid decryption information, establish a connection to the service provider via the bi-directional channel;

transmit authentication information over the bi-directional channel;

receive valid decryption information over the bi-directional channel; and decrypt the service using the valid decryption information.

70. The apparatus of claim 60, wherein the client is further configured to:

receive synchronization information for determining when the second decryption information is valid.

71. The apparatus of claim 60, wherein the client is further configured to:

receive and store one or more future keys for decrypting the service after the first and second decryption information are no longer valid.

72. An apparatus, comprising:

a service provider configured to:

receive a request for a service from a requestor;

authenticate the requestor;

transmit first decryption information over a bidirectional channel for reception by the requestor;

install the first decryption information on a device of the requestor, wherein the first decryption information decrypts the service;

transmit the service, encrypted with encryption information corresponding to the first decryption information, over a unidirectional channel;

generate second decryption information for use in decrypting the service at a later time;

encrypt the second decryption information with the encryption information corresponding to the first decryption information;

transmit the encrypted second decryption information over the unidirectional channel for reception by the requestor, and transmit the service, encrypted with encryption information corresponding to the second decryption information rather than with encryption information corresponding to the first decryption information, over the unidirectional channel.

73. An apparatus, comprising:

a service provider configured to:

receive a request for a service from a requestor over a bi-directional channel;

authenticate the requestor;

transmit a first key to the requestor over the bi-directional channel for decrypting the service;

transmit the service, encrypted with the first key, over a unidirectional channel; generate a second key for decrypting the service;

encrypt the second key with the first key;

transmit the encrypted second key over the unidirectional channel; and transmit the service, encrypted with the second key rather than with the first key, over the unidirectional channel.

74. The apparatus of claim 73 wherein, in addition to the first and second keys, at least one of an algorithm and a parameter are transmitted to the requestor to decrypt the service.

* * * * *